United States Patent
Satoh et al.

(10) Patent No.: US 7,525,752 B2
(45) Date of Patent: Apr. 28, 2009

(54) MEDIA DRIVE AND CONTROL METHOD FOR THE SAME

(75) Inventors: Noriaki Satoh, Kanagawa (JP); Masaharu Kawamura, Kanagawa (JP); Noboru Yoshida, Tokyo (JP); Kazunari Tsuchimoto, Kanagawa (JP); Toyomi Ohsawa, Kanagawa (JP)

(73) Assignee: Hitachi Global Storage Technologies Netherlands, Amsterdam (NL)

( * ) Notice: Subject to any disclaimer, the term of this patent is extended or adjusted under 35 U.S.C. 154(b) by 105 days.

(21) Appl. No.: 11/705,915

(22) Filed: Feb. 13, 2007

(65) Prior Publication Data
US 2007/0188907 A1    Aug. 16, 2007

(30) Foreign Application Priority Data
Feb. 15, 2006  (JP) ............................. 2006-038147
Sep. 27, 2006  (JP) ............................. 2006-263004

(51) Int. Cl.
    *G11B 5/60* (2006.01)
(52) U.S. Cl. ..................................... 360/75; 360/53
(58) Field of Classification Search ........................ None
    See application file for complete search history.

(56) References Cited

U.S. PATENT DOCUMENTS

| | | | | |
|---|---|---|---|---|
| 6,084,733 | A * | 7/2000 | Ohzeki et al. | 360/53 |
| 6,345,366 | B1 | 2/2002 | Asano et al. | |
| 7,095,587 | B2 * | 8/2006 | Kurita et al. | 360/128 |
| 7,097,110 | B2 * | 8/2006 | Sheperek et al. | 360/66 |
| 7,212,361 | B1 * | 5/2007 | Pederson et al. | 360/31 |
| 7,298,566 | B2 * | 11/2007 | Ueda et al. | 360/31 |
| 7,352,525 | B1 * | 4/2008 | Shrestha et al. | 360/75 |
| 7,355,803 | B2 * | 4/2008 | Yang | 360/31 |
| 2005/0094300 | A1 * | 5/2005 | Yano et al. | 360/31 |
| 2005/0122614 | A1 * | 6/2005 | Yun | 360/69 |
| 2005/0213250 | A1 * | 9/2005 | Kurita et al. | 360/234.4 |

FOREIGN PATENT DOCUMENTS

| | | |
|---|---|---|
| JP | 05-020354 | 1/1993 |
| JP | 2002-092810 | 3/2002 |
| JP | 2003-297029 | 10/2003 |

OTHER PUBLICATIONS

"Shortcut Error Recovery Procedure," IBM TDB UK, Dec. 1, 1999, Issue 428, p. 1703.*

* cited by examiner

*Primary Examiner*—Hoa T Nguyen
*Assistant Examiner*—James L Habermehl
(74) *Attorney, Agent, or Firm*—Townsend and Townsend and Crew LLP; Rambod Nader

(57) ABSTRACT

Embodiments in accordance with the present invention relate to improving error recovery process performance. A head slider in an embodiment of this invention includes a heater for adjusting a clearance between a head element section and a magnetic disk. During an error recovery process (ERP) for a reading error, if a particular environmental temperature is in a low-temperature region, a microprocessing unit (MPU) executes the ERP steps of increasing a heater power value of the heater (i.e., STEP X to STEP X+2), preferentially over the ERP steps of reducing the heater power (i.e., STEP X+3 to STEP X+5). In the low-temperature region, the possibility of error recovery in an earlier step can be raised by executing the heater power increasing ERP steps earlier than the heater power reducing ERP steps.

22 Claims, 13 Drawing Sheets

Fig. 4

Reading ERP table (For normal-temperature region)

| STEP NO | ERP STEP | STEP ORDER |
|---|---|---|
| ⋮ | ⋮ | ⋮ |
| STEP X-2 | CHANGE PARAMETER | n-2 |
| STEP X-1 | CHANGE TRACK OFFSET | n-1 |
| STEP X | HEATER POWER +4mW | n |
| STEP X+1 | HEATER POWER +8mW | n+2 |
| STEP X+2 | HEATER POWER +12mW | n+4 |
| STEP X+3 | HEATER POWER -4mW | n+1 |
| STEP X+4 | HEATER POWER -8mW | n+3 |
| STEP X+5 | HEATER POWER -12mW | n+5 |
| STEP X+6 | CHANGE PARAMETER | n+6 |
| ⋮ | ⋮ | ⋮ |

Fig. 5

Reading ERP table (For low-temperature region)

| STEP NO | ERP STEP | STEP ORDER |
|---|---|---|
| ⋮ | ⋮ | ⋮ |
| STEP X-2 | CHANGE PARAMETER | n |
| STEP X-1 | CHANGE TRACK OFFSET | n+1 |
| STEP X | HEATER POWER +4mW | n-m |
| STEP X+1 | HEATER POWER +8mW | n-m+1 |
| STEP X+2 | HEATER POWER +12mW | n-m+2 |
| STEP X+3 | HEATER POWER -4mW | n+k |
| STEP X+4 | HEATER POWER -8mW | n+k+1 |
| STEP X+5 | HEATER POWER -12mW | n+k+2 |
| STEP X+6 | CHANGE PARAMETER | n+k+3 |
| ⋮ | ⋮ | ⋮ |

Fig. 6

Reading ERP table (For high-temperature region)

| STEP NO | ERP STEP | STEP ORDER |
|---|---|---|
| ⋮ | ⋮ | ⋮ |
| STEP X-2 | CHANGE PARAMETER | n |
| STEP X-1 | CHANGE TRACK OFFSET | n+1 |
| STEP X | HEATER POWER +4mW | n+t |
| STEP X+1 | HEATER POWER +8mW | n+t+1 |
| STEP X+2 | HEATER POWER +12mW | n+t+2 |
| STEP X+3 | HEATER POWER -4mW | n-s |
| STEP X+4 | HEATER POWER -8mW | n-s+1 |
| STEP X+5 | HEATER POWER -12mW | n-s+2 |
| STEP X+6 | CHANGE PARAMETER | n+t-1 |
| ⋮ | ⋮ | ⋮ |

Fig. 8

Writing ERP table (For 'velocity-based abort')

| STEP NO | ERP STEP | STEP ORDER |
|---|---|---|
| ⋮ | ⋮ | ⋮ |
| STEP Y-2 | CHANGE PARAMETER | n |
| STEP Y-1 | CHANGE TRACK OFFSET | n+1 |
| STEP Y | HEATER POWER -2mW | n+2 |
| STEP Y+1 | HEATER POWER -4mW | n+3 |
| STEP Y+2 | HEATER POWER -6mW | n+4 |
| STEP Y+3 | HEATER POWER +2mW | SKIP |
| STEP Y+4 | HEATER POWER +4mW | SKIP |
| STEP Y+5 | HEATER POWER +6mW | SKIP |
| STEP Y+6 | WRITE CURRENT +αmA<br>HEATER POWER +2mW | SKIP |
| STEP Y+7 | WRITE CURRENT +αmA<br>HEATER POWER +4mW | SKIP |
| STEP Y+8 | WRITE CURRENT +αmA<br>HEATER POWER +6mW | SKIP |
| STEP Y+9 | CHANGE PARAMETER | n+5 |
| STEP Y+10 | LOAD UNLOAD | SKIP |
| ⋮ | ⋮ | ⋮ |

Fig. 9

Writing ERP table (For 'servo VGA abort')

| STEP NO | ERP STEP | STEP ORDER |
|---|---|---|
| ⋮ | ⋮ | ⋮ |
| STEP Y-2 | CHANGE PARAMETER | n |
| STEP Y-1 | CHANGE TRACK OFFSET | n+1 |
| STEP Y | HEATER POWER -2mW | SKIP |
| STEP Y+1 | HEATER POWER -4mW | SKIP |
| STEP Y+2 | HEATER POWER -6mW | SKIP |
| STEP Y+3 | HEATER POWER +2mW | n+2 |
| STEP Y+4 | HEATER POWER +4mW | n+3 |
| STEP Y+5 | HEATER POWER +6mW | n+4 |
| STEP Y+6 | WRITE CURRENT +αmA<br>HEATER POWER +2mW | n+5 |
| STEP Y+7 | WRITE CURRENT +αmA<br>HEATER POWER +4mW | n+6 |
| STEP Y+8 | WRITE CURRENT +αmA<br>HEATER POWER +6mW | n+7 |
| STEP Y+9 | CHANGE PARAMETER | n+8 |
| STEP Y+10 | LOAD UNLOAD | n+9 |
| ⋮ | ⋮ | ⋮ |

Fig. 12
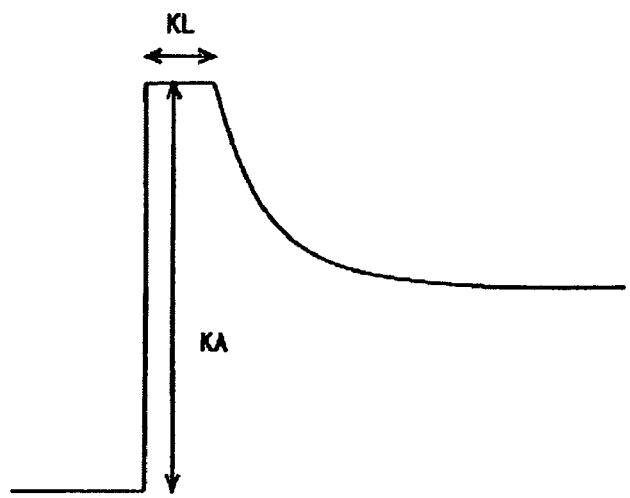
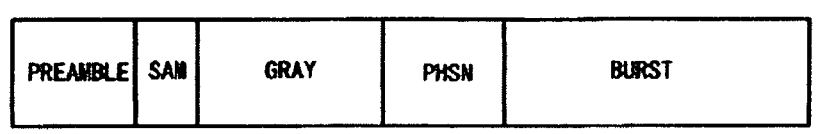
Fig. 13(a)
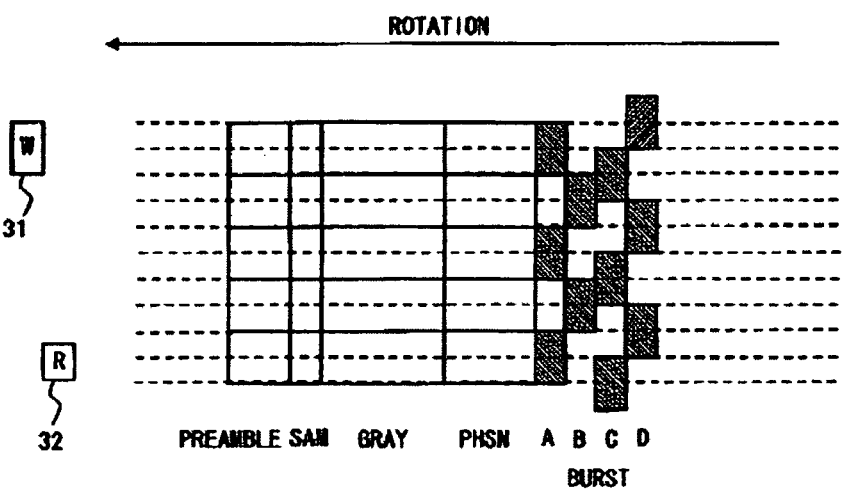
Fig. 13(b)

MEDIA DRIVE AND CONTROL METHOD FOR THE SAME

CROSS-REFERENCES TO RELATED APPLICATIONS

The instant nonprovisional patent application claims priority to Japanese Patent Application No. 2006-038147 filed Feb. 15, 2006, and to Japanese Patent Application No. 2006-263004 filed Sep. 27, 2006, both of which are incorporated by reference in their entirety herein for all purposes.

BACKGROUND OF THE INVENTION

Devices using various types of media such as optical disks, magnetic tapes, and semiconductor memories are known in the art as data storage devices. Among them, hard disk drives (hereinafter referred to as HDD) have become popular as storage devices for computers to such an extent that they are one of the storage devices indispensable for today's computer systems. Further, not limited to the computers as described above, HDDs are expanding more and more in application. For example, HDDs are used for moving picture recording/reproducing devices, car navigation systems, cellular phones, and removable memories for use in digital cameras.

The magnetic disks used in the HDD have a plurality of concentrically formed data tracks. A plurality of sets of servo data, each set including address information, and a plurality of data sectors each including a user data region are recorded on each data track. More than one data sector is recorded between the individual sets of servo data. The head element section of a head slider supported by an actuator which swings can access a desired data sector in accordance with the address information of the servo data, thus writing user data onto or reading out user data from the data sector.

To improve the recording density of a magnetic disk, it is important to reduce the clearance between the magnetic disk and the head element section flying above the surface of the magnetic disk. In order to achieve the reduction, several mechanisms for adjusting the clearance are proposed. One of the mechanisms is by providing the head slider with a heater and heating the head slider with this heater to adjust the clearance (refer to Japanese Patent Laid-Open No. 05-20635, for example). Hereinafter, this method is referred to as TFC (Thermal Flyheight Control). In TFC, an electric current is supplied to the heater to generate heat and make the head element section 12 protrude by its own thermal expansion. The clearance between the magnetic disk and the head element section is thus reduced.

If an error occurs during internal processing of the HDD, the HDD executes an error recovery process (ERP). The HDD has several kinds of ERPs, such as an ERP for the reading process of reading out user data from the magnetic disk, an ERP for the writing process of writing user data onto the magnetic disk, and an ERP for the process of reading out microcodes from the magnetic disk. Each ERP includes multiple ERP steps for modifying circuit parameters and target positions. The HDD achieves error recovery by executing each ERP step, and the ERP ends in the step where the HDD has recovered from the error.

Important in the ERP is to achieve error recovery in the earliest possible step and shorten the processing time required. A delay in error recovery reduces performance. In addition, if the processing time is too long, a host will judge the HDD to be inaccessible, and as a result, the connection to the HDD will be disconnected as a time-out error (time out).

It is therefore required that the appropriate ERP step be executed and that each ERP step be executed in the appropriate order.

Regarding the HDD, it is important to suppress the instability of the head characteristics. The instability appears as changes in the reading signal waveform of the reading element. More specifically, the deterioration of the instability increases reading signal noise, causing positive or negative amplitude of the reading signal to increase significantly and become asymmetrical. These events hinder accurate readout of servo data or user data. This is due to the fact that the free layer in the reading element does not have a single-domain structure and partly includes a small magnetic domain which exhibits a magnetic behavior different from that of other regions forming the layer.

The deterioration of the instability is therefore caused by such as factors such as the insufficient magnetic bias of a bias layer or the asymmetry of the magnetic bias applied from the hard bias layers formed at both sides of the free layer. Even when the instability does not manifest itself during the manufacturing phase of the HDD, if the bias layer is not completely formed during the manufacturing phase, electrostatic discharge (ESD), head-disk contact, or other events will deteriorate the instability after product shipping. It is therefore important to suppress the instability when the HDD is used.

BRIEF SUMMARY OF THE INVENTION

Embodiments in accordance with the present invention relate to improving error recovery process performance. A head slider in an embodiment of this invention includes a heater for adjusting a clearance between a head element section and a magnetic disk. During an error recovery process (ERP) for a reading error, if a particular environmental temperature is in a low-temperature region, a microprocessing unit (MPU) executes the ERP steps of increasing a heater power value of the heater (i.e., STEP X to STEP X+2), preferentially over the ERP steps of reducing the heater power (i.e., STEP X+3 to STEP X+5). In the low-temperature region, the possibility of error recovery in an earlier step can be raised by executing the heater power increasing ERP steps earlier than the heater power reducing ERP steps.

For a more complete understanding of the present invention, reference is made to the following detailed description taken in conjunction with the accompanying drawings.

BRIEF DESCRIPTION OF THE DRAWINGS

FIG. 4 is a diagram showing schematically an example of a reading ERP table relating to a normal-temperature region according to an embodiment of the present invention.

FIG. 5 is a diagram showing schematically an example of a reading ERP table relating to a low-temperature region according to an embodiment of the present invention.

FIG. 6 is a diagram showing schematically an example of a high-temperature region reading ERP table according to an embodiment of the present invention.

FIG. 8 is a diagram showing schematically an example of a writing ERP table for a 'velocity-based write abort' error according to an embodiment of the present invention.

FIG. 9 is a diagram showing schematically an example of a writing ERP table for a 'servo VGA abort' error according to an embodiment of the present invention.

FIG. 10 is a diagram schematically showing a structure of a magnetoresistive element according to an embodiment of the present invention.

FIG. 12 is a diagram schematically showing a writing current waveform according to an embodiment of the present invention.

FIGS. 13(a) and 13(b) are diagrams schematically showing a data format of a servo pattern according to an embodiment of the present invention.

DETAILED DESCRIPTION OF THE INVENTION

Figure 1:
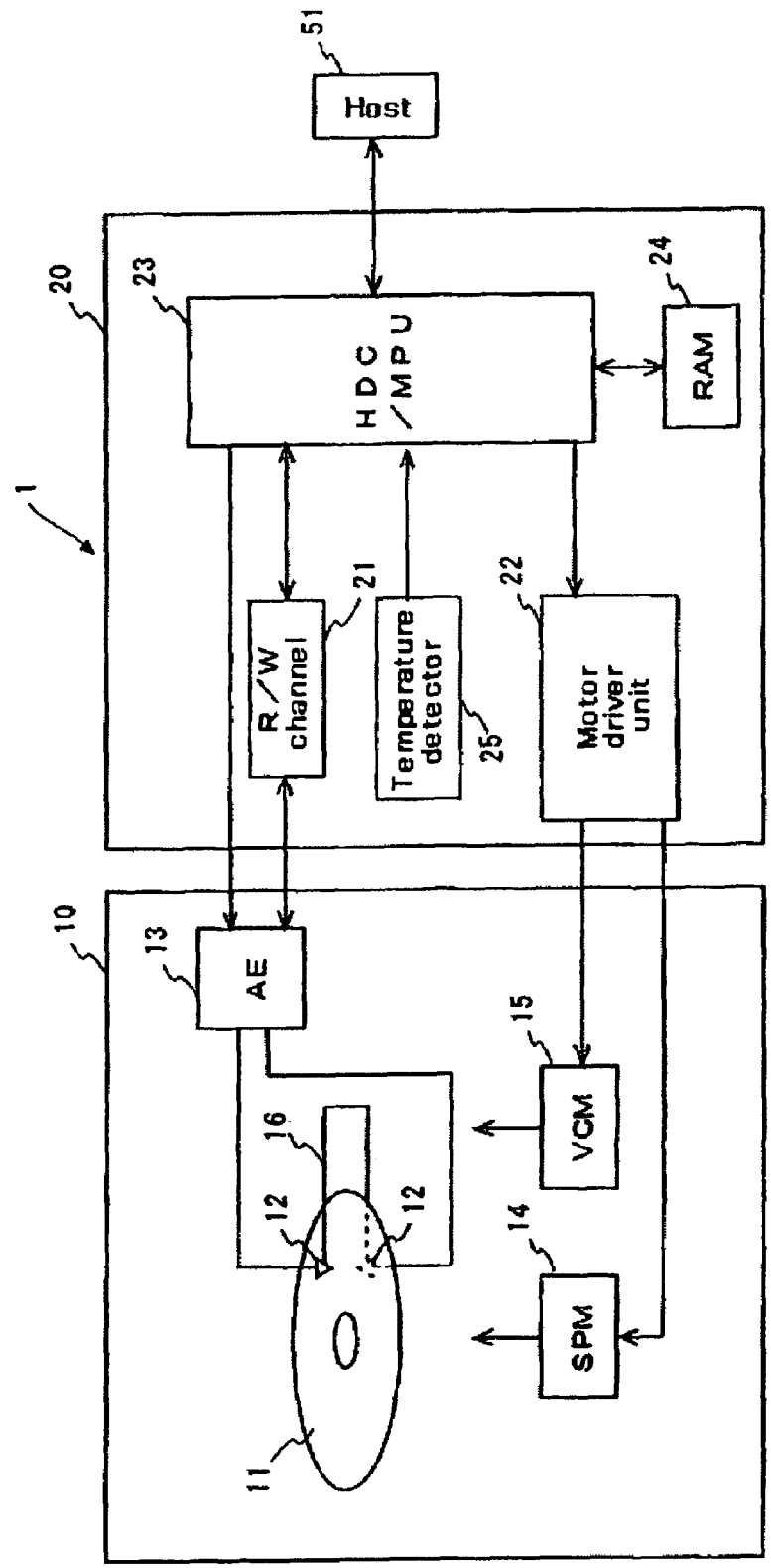
FIG. 1 is a block diagram showing schematically a total configuration of an HDD according to an embodiment of the present invention.

Embodiments in accordance with the present invention relate to media drives and methods of controlling the same, and more particularly to heater control of a media drive which has a heater for adjusting a clearance between a head element section and a recording medium.

A media drive according to an embodiment of the present invention includes: a slider that flies above a rotating medium; a head element section disposed in the slider; a heater that causes the head element section to protrude by thermal expansion and adjusts a clearance between the medium and the head element section; a table which, if an error occurs, identifies an execution step of an error recovery process for the error, and which includes a step of changing the heater in heater power; and a controller that conducts execution control of the execution step identified by the table. The table can enhance certainty of the error recovery by including the heater power changing step as the execution step of the error recovery process.

In one embodiment of the present invention, the media drive further includes a temperature detector and in accordance with a temperature detected by the temperature detector, changes the heater power changing step to be executed in the error recovery process. The certainty of the error recovery can be raised by selecting an appropriate step according to the detected temperature.

In one embodiment of the present invention, the media drive further includes a temperature detector and in accordance with a temperature detected by the temperature detector, changes execution priority of the heater power changing step in the error recovery process. The error recovery can thus be conducted earlier.

In one embodiment of the present invention, the media drive further includes a temperature detector and in an error recovery process for a reading error, if a temperature detected by the temperature detector is lower than a reference temperature, the table identifies the step of increasing the heater power, as an execution step. The certainty of the error recovery can thus be raised. In addition, the table may identify the step of increasing the heater power and the step of reducing the heater power, as execution steps, and execution priority of the step of increasing the heater power may be higher than execution priority of the step of reducing the heater power. The error recovery can thus be conducted earlier.

In one embodiment of the present invention, the media drive further includes a temperature detector and in an error recovery process for a reading error, if a temperature detected by the temperature detector is higher than a reference temperature, the table identifies the step of reducing the heater power, as an execution step. The certainty of the error recovery can thus be raised.

In one embodiment of the present invention, the table identifies the step of increasing the heater power and the step of reducing the heater power, as execution steps, and execution priority of the step of reducing the heater power may be higher than execution priority of the step of increasing the heater power. The error recovery can thus be conducted earlier.

The heater power changing step to be executed in the error recovery process may be changed according to the type of error. The certainty of the error recovery can thus be raised.

Furthermore, in an error recovery process for a writing error during data writing onto the medium, the table may identify the step of reducing the heater power, as an execution step. The certainty of the error recovery can thus be raised.

Alternatively, in an error recovery process for an error whose servo data reading signal level during a writing process is lower than a reference level, the table may identify the step of increasing the heater power, as an execution step. The certainty of the error recovery can thus be raised. Additionally, heater power in the execution step may be determined in accordance with the servo data reading signal level. The heater can thus be controlled according to particular flying height of a head.

The table may be adapted to changing a writing current waveform so as to reduce strength of a magnetic field generated, and to increase the heater power so as to compensate for a decrease in calorific value due to the change in the waveform. An error recovery process appropriate for instability of the head element section can thus be conducted.

The controller may be constructed to judge whether instability of the head element section is in excess of a reference value, and if the reference value is judged to be exceeded, raise an execution priority level of the step of changing the heater power. Thus, early recovery from an error in a deterioration state of the instability can be achieved. In addition, the controller may raise execution priority of the heater power reducing step to a level higher than that of the heater power increasing step. Thus, early recovery from the error can be achieved, for an increase in the heater power generally deteriorates the instability.

Another embodiment of the present invention is a method of controlling a media drive including a slider which flies above a rotating medium, a head element section which is disposed in the slider, and a heater which is disposed in the slider, makes the head element section protrude by thermal expansion, and adjusts a clearance between the medium and the head element section. The control method includes: if an error occurs, referring to a table that identifies an execution step of an error recovery process for the error; and in the error recovery process, executing the step identified by the table in order to change the heater in heater power. Certainty of the error recovery can be raised by executing the heater power changing step in the error recovery process.

In the error recovery process, the heater power changing step to be executed may be changed in accordance with a detected temperature. Alternatively, in the error recovery process, execution priority of the heater power changing step may be changed in accordance with a detected temperature.

Further alternatively, in the error recovery process, the heater power changing step to be executed may be changed according to the type of error.

A media drive according to another embodiment of the present invention includes: a slider that flies above a rotating medium; a head element section disposed in the slider; a heater disposed in the slider and adapted for causing the head element section to protrude by thermal expansion and adjusting a clearance between the medium and the head element section; and a controller that judges whether instability of the head element section is in excess of a reference value, and if the reference value is judged to be exceeded, adjusts power supplied to the heater.

Thus, the instability of the head element section can be suppressed.

In one embodiment of the present invention, the controller judges the instability of the head element section on the basis of an error rate of data which has been read out by the head element section. Alternatively, the controller judges the instability of the head element section on the basis of an execution rate of error recovery processes with respect to data reading operations and/or an execution rate of specific steps in an error recovery process. Alternatively, the controller judges the instability of the head element section on the basis of an error rate of registered servo data read out from the medium by which the head element section. Alternatively, the controller judges the instability of the head element section on the basis of amplitude and/or symmetry of a waveform of a signal from a reading element of the head element section. Thus, the instability can be judged more appropriately and accurately.

In another embodiment of the present invention, the instability is judged using at least any two criteria of all those which include an error rate of data read out by the head element section, an execution rate of error recovery processes with respect to data reading operations and/or an execution rate of specific steps in an error recovery process, an error rate of registered servo data read out from the medium by the head element section, and amplitude and/or symmetry of a waveform of a signal from a reading element of the head element section. If the required plurality of judgment criteria are all overstepped, the controller judges that the instability of the head element section is outside an allowable range. Thus, the instability can be judged more appropriately and accurately.

According to the present invention, the error recovery process in a media drive can be improved or the occurrence of errors therein can be suppressed.

An embodiment that can apply the present invention will be described hereunder. The description below and the accompanying drawings are omitted and simplified as appropriate for clarity of the description. Also, the same reference number is assigned to the same constituent element in each drawing, and overlapping description is omitted as necessary for descriptive clarity.

One of the factors featuring the present embodiment is TFC (Thermal Flyheight Control) in an error recovery process for a media drive. The TFC adjusts a clearance between a head element section and a recording disk by means of thermal expansion caused by the heat generated on a slider. Hereinafter, an embodiment of the present invention will be described taking a hard-disk drive (HDD) as an example of a media drive. In order to facilitate understanding of the above-mentioned feature of the present embodiment, a total configuration of the HDD will be first outlined below.

FIG. 1 is a block diagram showing schematically the total configuration of the HDD 1 according to an embodiment of the present invention. As shown in FIG. 1, the HDD 1 includes in a hermetically sealed enclosure 10: a magnetic disk 11 that is an example of a recording disk, a head slider 12, arm electronics (AE) 13, a spindle motor (SPM) 14, a voice coil motor (VCM) 15, and an actuator 16.

The HDD 1 also has a circuit board 20 fixed to the outside of the enclosure 10. A read/write channel (R/W channel) 21, a motor driver unit 22, an integrated circuit 23 including a hard-disk controller (HDC) and a microprocessing unit (MPU) in combination (hereinafter, the HDC/MPU 23), a RAM 24, and other ICs are arranged on the circuit board 20. Constituent elements of each circuit can be integrated into one IC or mounted in a plurality of split ICs. User data from an external host 51 is received by the HDC/MPU 23 and then written onto the magnetic disk 11 via the R/W channel 21 and the AE 13 by the head slider 12. User data that has thus been stored onto the magnetic disk 11 is read out by the head slider 12, and the user data is output from the HDC/MPU 23 to the external host 51 via the AE 13 and the R/W channel 21.

The magnetic disk 11 is secured to the SPM 14. The SPM 14 rotates the magnetic disk 11 at a required angular velocity. The motor driver unit 22 drives the SPM 14 in accordance with control data from the HDC/MPU 23. The magnetic disk 11 in the present example has a data-recording surface on both sides, and head sliders 12 are provided in a form associated with the recording surfaces. Each head slider 12 includes a slider section that flies above the magnetic disk, along the surface of the disk, and a head element section that is fixed to the slider section and conducts conversions between magnetic signals and electrical signals. The head slider 12 in the present embodiment has a heater that causes protrusion of the head element section by heating and conducts the TFC to adjust a clearance (flying height) between the head element section and the magnetic disk. Structure of the head slider 12 will be detailed later with reference being made to FIG. 2.

Each head slider 12 is fixed to a front end of the actuator 16. The actuator 16 is coupled to the VCM 15, and pivots about a rotating shaft to move the head slider 12 in a radial direction of the rotating magnetic disk 11, on the surface of the disk. The motor driver unit 22 drives the VCM 15 in accordance with the control data (called DACOUT) from the HDCIMPU 23. The number of magnetic disks 11 can be one or more than one, and a recording surface can be formed on one side or both sides of the magnetic disk 11.

The AE 13 selects, from a plurality of head element sections 12, one head element section 12 to access the magnetic disk 11, then amplifies at a definite gain level a reading signal reproduced by the selected head element section 12, and sends the reading signal to the R/W channel 21. Also, a recording signal from the R/W channel 21 is transferred to the selected head element section 12. In addition, the AE 13 supplies an electric current (electric power) to the heater and functions as a regulating circuit to regulate the amount of current supplied.

After receiving the reading signal supplied from the AE 13 during a reading process, the R/W channel 21 amplifies the reading signal so as to obtain constant amplitude. Additionally, the R/W channel 21 extracts data from the acquired reading signal and decodes the data. Data that is read out after being decoded includes user data and servo data. The decoded user data and servo data are supplied to the HDC/MPU 23. In addition, the R/W channel 21 conducts code modulations on write data which has been supplied from the HDC/MPU 23 during a writing process, then further converts the code-modulated write data into a writing signal, and supplies the writing signal to the AE 13.

The MPU in the HDC/MPU 23 operates, pursuant to microcodes that have been loaded into the RAM 24. As the HDD 1 starts operating, the data required for control and for data processing, in addition to the microcodes operating on the MPU, is loaded from the magnetic disk 11 or a ROM (not shown). The HDC/MPU 23 executes necessary processes relating to data processing and total control for the HDD 1, such as reading/writing process control, command execution priority management, servo signal-based positioning control (servo control) of the head element section 12, interface control, defect management, and ERPs for recovering the HDD 1 from errors. The HDC/MPU 23 also executes total control of the HDD 1. In particular, the HDC/MPU 23 in the present embodiment executes the TFC in the ERP. The TFC in the ERPs will be described later herein.

Figure 2:
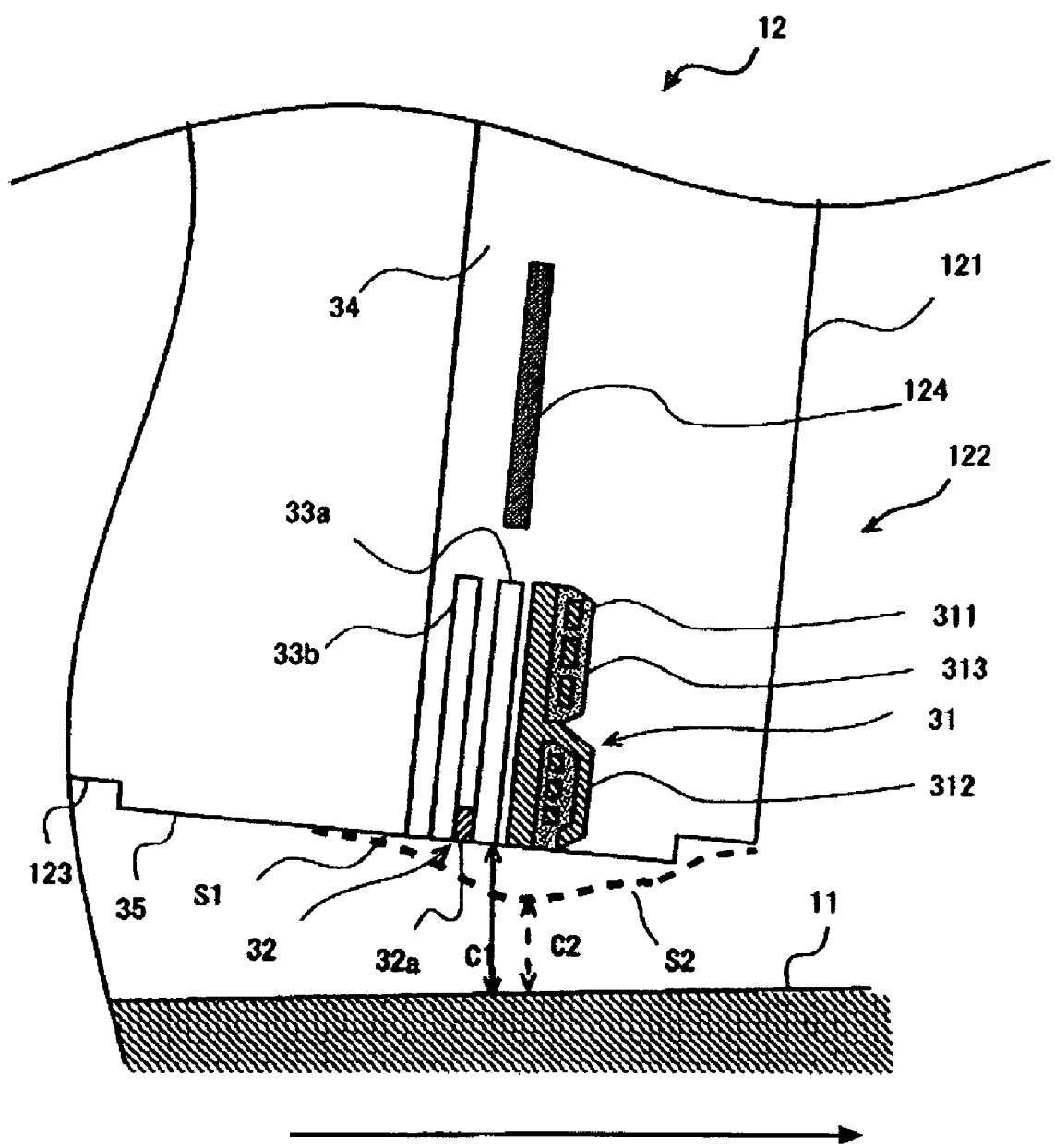
FIG. 2 is a sectional view showing a construction of a head slider which has a heater for TFC according to an embodiment of the present invention.

Next, a construction of the TFC head slider 12 in accordance with an embodiment is described below. FIG. 2 is a sectional view showing a partial construction of the head slider 12, in neighborhood of an air outflow edge (trailing-side edge) thereof. The magnetic disk 11 rotates from the left of FIG. 2 towards the right. The head slider 12 has a head element section 122 and a slider section 123 which supports the head element section 122. The TFC in the present embodiment can be applied to both an HDD that employs perpendicular magnetic recording, and an HDD that employs longitudinal magnetic recording.

The head element section 122 conducts magnetic data read/write processes on the magnetic disk 11. The head element section 122 has a reading element 32 and a writing element 31 located at the trailing side of the head element section 122. The writing element 31 is an inductive element which, by using an electric current flowing through a writing coil assembly 311, generates a magnetic field between magnetic pole pieces 312 and thus records the magnetic data on the magnetic disk 11. The reading element 32 is a magnetoresistive type of element, which includes a magnetoresistive element 32a having magnetic anisotropy and reads out recorded magnetic data from the magnetic disk 11 by using a resistance value of the element 32a; wherein the resistance value changes according to particular strength of a magnetic field stemming from the magnetic disk 11.

The head element section 122 is formed on an AlTiC substrate that constitutes the slider section 123, the formation being conducted using a thin-film forming process such as plating, sputtering, or polishing. The magnetoresistive element 32a is sandwiched between magnetic shields 33a, 33b, and the writing coil assembly 311 is surrounded by a dielectric film 313. Also, the head element section 122 has a protective film 34 formed of, for example, alumina, around the writing element 31 and the reading element 32, and the entire head element section 122 is protected with the protective film 34. In neighborhood of the writing element 31 and the reading element 32, a heater 124 using a resistor formed of a thin film is formed using a thin-film forming process. In the present example, the heater 124 is positioned at a diamagnetic end of the head element section 122 with respect to the magnetic disk 11. The heater 124 can be formed by zigzagging a permalloy-based thin-film resistor and filling in clearances with alumina.

When the AE 13 supplies a current to the heater 124, heat from the heater 124 causes the head element section 122 to protrude and deform in its neighborhood. In a non-heating state, an air bearing surface (ABS) of the head slider 12 is of the shape shown as S1, and the clearance between the head element section 122 and the magnetic disk is shown as C1. A protruding surface shape S2 during heating by the heater 124 is schematically shown as a discontinuous line in FIG. 2. The head element section 122 approaches the magnetic disk 11, and a clearance C2 between both at this time is smaller than the clearance C1. FIG. 2 is a conceptual diagram only, and does not reflect actual dimensional relationships. The protruding surface shape S2, for example, is of an order of nanometers (i.e., several nanometers) in terms of the amount of protrusion. The amount of protrusion of the head element section 122 changes according to the heater power supplied to the heater 124.

As described above, the TFC in ERPs constitutes one major feature of the HDD 1 in the present embodiment. The ERP in the reading process conducted to read out user data from the magnetic disk 11, and the ERP in the writing process conducted to write user data onto the magnetic disk 11 will be described hereinafter. These processes can be applied to other ERPs such as the ERP in the process of reading out microcodes from the magnetic disk 11.

First, the ERP in the reading process is described below. If an error occurs during the reading process, the HDD 1 executes an associated ERP (hereinafter, called the reading ERP). As shown in a block diagram of FIG. 3, an MPU 232 conducts the reading ERP in accordance with a reading ERP table 241 stored within the RAM 24. A plurality of steps, for example, 256 ERP steps are registered in the reading ERP table 241, and the MPU 232 executes each ERP step in sequence.

Typical ERP steps include, for example, changing a filtering coefficient of a waveform-equalizing filter in the R/W channel 21, and changing a track offset value of the head element section 122. In particular, the reading ERP table 241 in the present embodiment includes an ERP step for conducting changes (inclusive of ON/OFF) on the heater power for the TFC. Thus, resolution of the reading signal is changed for improved error recovery performance. The resolution increases with increases in the heater power.

Figure 3:
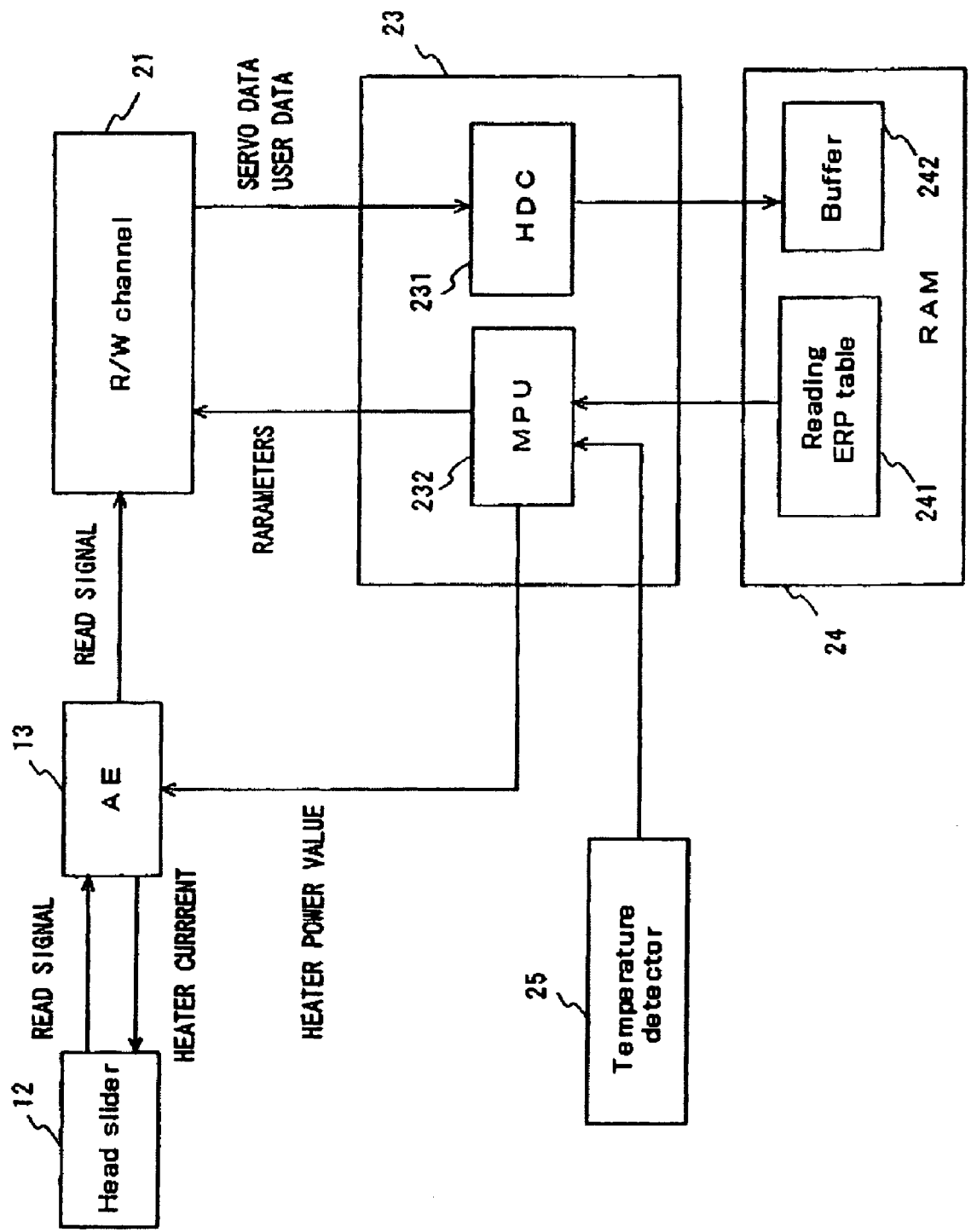
FIG. 3 is a block diagram showing schematically a logical configuration associated with a reading ERP according to an embodiment of the present invention.

The MPU 232 can change the coefficient of the waveform-equalizing filter by setting parameters in a register of the R/W channel 21. Positioning of the head element section 122 is conducted by the MPU 232 using a servo circuit of an HDC 231. The R/W channel 21 extracts servo data from a reading signal (in FIG. 3, shown as READ SIGNAL) supplied from the head slider 12 via the AE 13. The MPU 232 acquires the servo data via the servo circuit of the HDC 231 and conducts positioning control of the head element section 122.

The MPU 232 can also change the electric power (current) supplied to the heater 124, by setting a heater power value in a register of the AE 13. The AE 13 supplies current (power) to the heater 124 of the head slider 12 in accordance with the above-set value. User data that has been read out from the magnetic disk 11 during the ERP is stored into a buffer 242 via the R/W channel 21 and the HDC 231.

In the reading ERP of the present embodiment, order of execution of ERP steps for the TFC is changed according to environmental temperature. Description will be given below of an example in which detected-temperature regions are divided into three regions (a low-temperature region, a normal-temperature region, and a high-temperature temperature region) and the order of execution of the ERP steps for the TFC is changed according to a particular change of the temperature region. Definition of each temperature region is based on a predetermined reference region.

In accordance with the environmental temperature that the temperature detector 25 has detected, the MPU 232 determines the order of execution of each step registered in the reading ERP table. In each temperature region, the MPU 232 also skips specific ERP steps and selects other ERP steps as execution steps. Selected execution steps are sequentially executed and the ERP is completed in the step where the error recovery has been successfully conducted.

The MPU 232 changes the heater power according to the environmental temperature that the temperature detector 25 has detected. Typically, the heater power continuously increases with decreases in the temperature, and at a lower reference temperature or less, the heater power takes a maximum constant value. At an upper reference temperature or more, the heater power is set to be zero.

FIG. 4 shows the order of ERP step execution in the normal-temperature region. The step numbers listed as STEP X to STEP X+5 under STEP NO. in FIG. 4, are the ERP steps for the TFC. The order of execution of each ERP step (i.e., STEP ORDER) shown by way of example in FIG. 4 agrees with order of the step numbers. In the normal-temperature region, the MPU 232 executes the heater power increasing and reducing ERP steps in an alternate fashion. In FIG. 4, X and "n" are positive integers. While each ERP step in the present example is executed to increase or reduce the defined power value, the present invention is not limited to the example and a change rate of a present power value, for example, may be defined.

In the example of FIG. 4, after executing the step of increasing the heater power by 4 mW, the MPU 232 executes the step of reducing the heater power by 4 mW. Additionally, after executing the step of increasing the heater power by 8 mW, the MPU 232 executes the step of reducing the heater power by 8 mW. The MPU 232 also conducts similar processes for a 12-mW increase and decrease of the heater power. The values by which the heater power is to be increased or reduced are determined by an independent design for each HDD, and the values shown above are a mere example.

At normal temperature, a change in the resolution according to the particular environmental temperature does not tend to become constant. Error recovery in an earlier step can be expected by executing the heater power increasing and reducing ERP steps in an alternate fashion as described above, that is, by conducting alternate increasing and reducing operations on the amount of protrusion of the head element section 122.

FIG. 5 shows an example of the order of ERP step execution in a low-temperature region. In the low-temperature region, the MPU 232 executes the heater power increasing ERP steps (STEP X to STEP X+2) preferentially over the heater power reducing ERP steps (STEP X+3 to STEP X+5). In FIG. 5, "k" and "m" are positive integers. Typically, the resolution exhibits a tendency towards degradation in the low-temperature region. In the low-temperature region, therefore, a possibility of error recovery in an earlier step can be enhanced by executing the heater power increasing ERP steps in advance of the heater power reducing ERP steps. The MPU 232, if so designed, can skip the ERP steps of reducing the heater power.

In addition, the order of execution of the ERP steps of increasing the heater power may be advanced in comparison with the order of ERP step execution at normal temperature or above. In the examples of FIGS. 4 and 5, each ERP step of increasing the heater power at low temperature is "m" steps advanced. Since the resolution is likely to be low in the low-temperature region as described above, earlier error recovery can be implemented by assigning the heater power increasing steps a higher priority level than in temperature regions exceeding the normal-temperature region.

Furthermore, the ERP steps of reducing the heater power may be assigned a lower priority level than in temperature regions which exceed normal temperature. That is to say, the order of execution of the heater power reducing steps may be delayed behind the order of execution thereof in temperature regions which exceed normal temperature. This is because the possibility of error recovery in other ERP steps is considered to be higher than that of the heater power reducing ERP steps.

FIG. 6 shows an example of the order of ERP step execution in a high-temperature region. In the high-temperature region, the MPU 232 executes the heater power reducing ERP steps (STEP X+3 to STEP X+5) preferentially over the heater power increasing ERP steps (STEP X to STEP X+2). In FIG. 6, "s" and "t" are positive integers. Typically, the resolution of the reading signal exhibits a tendency towards improvement in the high-temperature region. In the high-temperature region, therefore, the possibility of error recovery in an earlier upper-level step can be enhanced by executing the heater power reducing ERP steps in advance of the heater power increasing ERP steps. The MPU 232, if so designed, can skip the ERP steps of increasing the heater power.

In addition, the order of execution of the ERP steps of reducing the heater power may be advanced in comparison with the order of ERP step execution at normal temperature or below. In the examples of FIGS. 4 and 6, each ERP step of increasing the heater power at low temperature is "s" steps advanced. Since the resolution is likely to be high in the high-temperature region as described above, earlier error recovery can be implemented by assigning the heater power reducing steps a higher priority level than in the normal-temperature region or below. In the high-temperature region, if the heater power is zero and the heater 124 is in an OFF state, the MPU 232 skips each ERP step of reducing the heater power.

Furthermore, the ERP steps of increasing the heater power may be assigned a lower priority level than in temperature regions below normal temperature. That is to say, the order of execution of the heater power increasing steps may be delayed behind the order of execution thereof in temperature regions below normal temperature. This is because the possibility of error recovery in other ERP steps is considered to be higher than that of the heater power increasing ERP steps. Moreover, the MPU 232 may skip the heater power increasing ERP steps according to the detected temperature. This makes it possible to avoid contact of the head element section 122 with the magnetic disk 11 due to the protrusion of the head element section 122.

Next, the ERP in the writing process are described below. In the writing process, write data from the host 51 is stored in the buffer 242, and the write data is transferred to the R/W channel 21 by the HDC 231. The write data is converted into a writing signal (WRITE SIGNAL) and then sent to the head slider 12 via the AE 13.

If an error occurs during the writing process, the HDD 1 executes an associated ERP (hereinafter, called the writing ERP). As shown in a block diagram of FIG. 7, the MPU 232 conducts the writing ERP in accordance with a writing ERP table 243 stored within the RAM 24. A plurality of steps, for example, 64 ERP steps are registered in the writing ERP table 243, and the MPU 232 executes each ERP step in sequence. The writing ERP table 243, as with the reading ERP table, includes the ERP steps of changing the TFC heater power, and the ERP steps of modifying other circuit parameters.

During the writing process, the heater 124 is typically in an OFF state in temperature regions above normal temperature, because of the protrusion of the head element section 122 due to a writing current. The HDD 1, however, may be constructed so that only immediately before the writing current flows, the heater 124 will be turned ON to prevent 'poor overwriting' during an initial phase of writing. Alternatively, the HDD 1 may be designed so that the current is supplied to the heater 124 at normal temperature or more.

In the present example, in accordance with the kind of error in the writing process, the MPU 232 selects writing ERP steps to be executed and changes the order of execution of the writing ERP steps. Among typical errors in the writing process is 'write abort'. If the head element section 12 moves away from a target position by a predetermined reference level or more, the HDD 1 aborts the writing process and then executes the writing ERP.

The head element section 122 can move away from the target position, in two directions. One is a radial direction of the magnetic disk 11, and the other is a direction perpendicular to a recording surface of the magnetic disk 11. A positional shift in the radial direction causes an error of data being written into a position different from the target position such as off track or squeeze write, and/or the resulting damage to data present on adjacent tracks. If flying height is too great, 'poor overwriting' results since sufficient magnetic fluxes from the writing element fail to reach the recording surface.

The HDD 1 uses a value of a servo address to detect the radial shift in the position of the head element section 122 from a target track. The servo address includes a servo track, a servo sector, and a position error signal. If the detected present servo address is shifted from the target by at least a reference value, the HDD 1 aborts the writing process. This prevents data from being written into that position shifted from the target.

In the present embodiment, a writing error due to the radial shift in the position of the head element section 12 is called 'write tracking abort'. In particular, 'write tracking abort' due to the fact that the head position is shifted from a central position of the target track by at least a position error signal reference level before or during data writing, is called 'position-based abort'. Also, 'write tracking abort' due to the fact that even if 'position-based abort' does not happen, an off-track state occurs during data writing onto the magnetic disk 11 and causes the position error signal to abruptly change by at least the reference level thereof within a unit time, is called 'velocity-based abort'.

The HDD 1 uses a gain value of servo VGA (Variable Gain Amplifier) to detect a moving distance of the head element section 122 in a flying direction (perpendicular direction) thereof from the target position. The servo VGA gain varies inversely with respect to reading amplitude of a servo signal. When the head element section 12 moves away from the recording surface, therefore, the reading amplitude of the servo signal decreases and the servo VGA gain increases. If the servo VGA gain exceeds a reference level during data writing, the HDD 1 aborts the writing process. This prevents 'poor overwriting'. In the present embodiment, the above error due to an increase in flying height of the head is called 'write VGA abort'.

FIG. 8 is a table showing the order of ERP step execution in a 'velocity-based abort' event. In each item of the table, various control parameters of the HDD 1 are modified for rewriting. The writing ERP table 243 shown in FIG. 8 includes, as ERP steps relating to the TFC, ERP steps (STEP Y to STEP Y+5) that increase/reduce the heater power, and ERP steps (STEP Y+6 to STEP Y+8) intended to increase the writing current as well as to increase the heater power.

In accordance with the type of writing error, the MPU 232 determines the ERP steps within the writing ERP table 243 that are to be executed, and the order of execution of the determined ERP steps. For example, the writing ERP table 243 has 64 pre-registered ERP steps, and the MPU 232 selects part of the 64 ERP steps according to the particular error type and changes the order of execution of the selected ERP steps.

Figure 7:
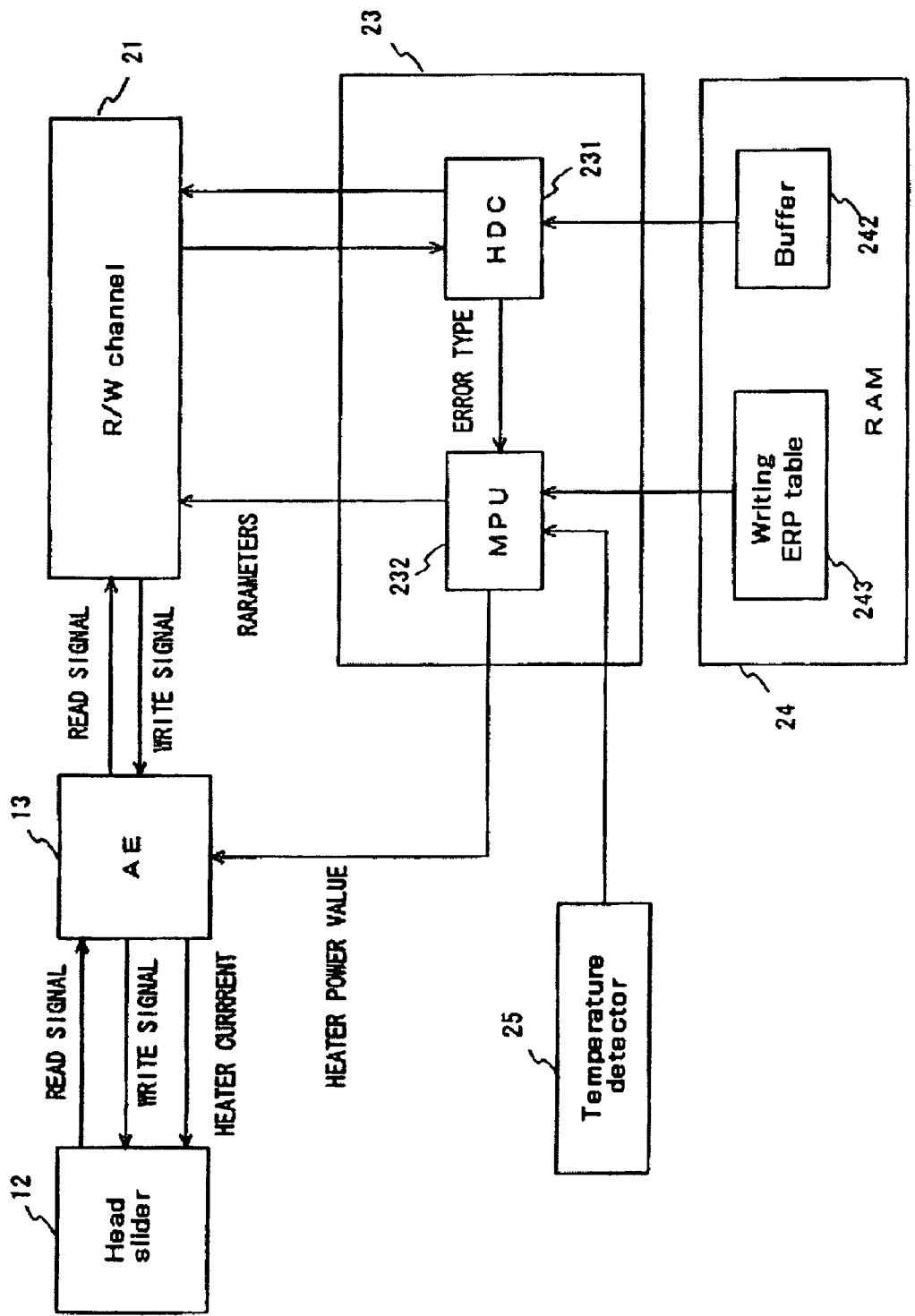
FIG. 7 is a block diagram showing schematically a logical configuration associated with a writing ERP according to an embodiment of the present invention.
Figure 1:
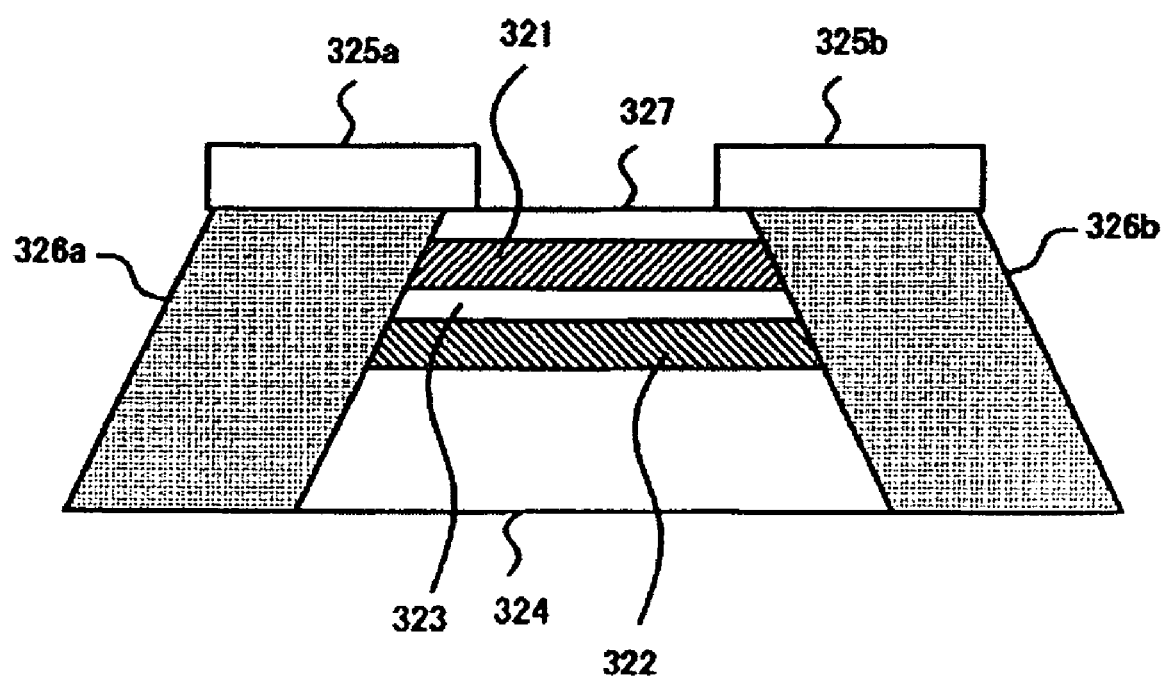

As shown in FIG. 7, if an error occurs during the writing process, the type of error is notified as ERROR TYPE from the HDC 231 to the MPU 232. The error type is, for example, the above-described 'position-based abort', 'velocity-based abort', 'write VGA abort', or the like. Other types of errors include those due to a temperature rise of the AE 13, for example.

After receiving a notice of 'velocity-based abort' from the HDC 231, the MPU 232 executes each ERP step in accordance with the ERP step execution priority shown in FIG. 8. If 'write tracking abort', that is, 'velocity-based abort' occurs during a second half of data writing onto the magnetic disk 11, protrusion of the head element section 122 due to the writing current is most likely to be causing head-disk contact. The MPU 232, therefore, selects the heater power reducing ERP steps (STEP Y to STEP Y+2) as execution steps.

After receiving a notice of 'position-based abort' from the HDC 231, the MPU 232 preferably skips the heater power adjusting ERP steps (STEP Y to STEP Y+5) or executes other ERP steps, such as modifying the control parameters, preferentially over (in advance of) the heater power adjusting ERP steps. This is because 'position-based abort' is considered to have no relationship with head-disk contact.

However, the ERP steps of increasing the heater power (i.e., STEP Y+3 to STEP Y+8) are skipped. This prevents head-disk contact. For an error in the AE 13, for instance, since the ERP steps for the TFC are unnecessary, the MPU 232 also skips the ERP steps of the TFC.

A writing ERP relating to 'servo VGA abort' is described below. After receiving a notice of 'servo VGA abort' from the HDC 231, the MPU 232 executes each ERP step in accordance with the ERP step execution priority shown in FIG. 9. Since 'servo VGA abort' is also due to an increase in the flying height of the head, it is possible to reduce the clearance between the head element section 122 and the magnetic disk 11 by increasing the heater power. Error recovery can thus be achieved. Therefore, the MPU 232 selects the ERP steps of increasing the heater power (i.e., STEP Y+3 to STEP Y+5), as execution steps. The ERP steps of reducing the heater power (i.e., STEP Y to STEP Y+2) are skipped.

If 'servo VGA abort' occurs, the MPU 232 executes a head slider loading/unloading ERP step (STEP Y+10). For the 'servo VGA abort' error, the ERP steps of increasing the heater power are preferably conducted earlier than the loading/unloading ERP step, since TFC-based adjustment is an error recovery method more reliable than head slider loading/unloading.

Additionally, the MPU 232 selects the ERP steps of increasing both the writing current and the heater power together (i.e., STEP Y+6 to STEP Y+8), as execution steps. Increasing both the heater power and the writing current together makes it possible to further improve writing characteristics and thus to achieve error recovery from 'poor overwriting'. In order to avoid head-disk contact, the ERP steps of increasing both the writing current and the heater power together are preferably executed later than the steps of increasing only the heater power.

In another embodiment of the present invention, the MPU 232 determines a heater power value from the gain level of the servo VGA in an error. For example, during manufacturing tests of the HDD 1, normal servo VGA value is identified and this value is registered as a reference gain level. The MPU 232 determines a heater power value (an increment in the heater power) from a difference between the registered reference gain level and an actual servo VGA gain level obtained if 'servo VGA abort' occurs. More specifically, the MPU 232 determines the heater power value arithmetically or in accordance with a registered data table. The heater power value is determined so as to cancel a variation between the flying height in the 'abort' error state, and normal flying height.

While the foregoing examples are for selecting execution steps by skipping some of the ERP steps pre-registered in tables, an independent ERP table including only ERP steps to be executed is constructible for each ERP process.

Next, an ERP associated with the instability of the head element section 122 is described below. The MPU 232 judges whether the instability has deteriorated to overstep criteria. If the instability is judged to have overstepped the criteria, the MPU 232 raises execution priority of the heater power changing steps in an associated ERP table to a level higher than that effective when the criteria is not overstepped. While the change of the execution priority may be conducted for all steps of changing the heater power, the change may be conducted only for a part of the changing steps. This makes earlier error recovery in the ERP possible.

The instability appears as changes in a reading signal waveform of the reading element 32. More specifically, the deterioration of the instability increases reading signal noise or causes positive or negative amplitude of the reading signal to increase significantly and become asymmetrical. These events hinder accurate readout of servo data or user data. This is due to the fact that a free layer within the magnetoresistive element 32a does not have a single-domain structure and partly includes a small magnetic domain which exhibits a magnetic behavior different from that of other regions forming the layer.

FIG. 10 schematically shows a partial configuration of the magnetoresistive element 32a when the element 32a is viewed from a direction of the recording surface of the magnetic disk 11. The magnetoresistive element 32a is a multi-layer stacked structure formed up of an antiferromagnetic layer 324, a pinned layer 322, a nonmagnetic layer 323, a free layer 321, and a protective layer 327. The pinned layer 322 and the free layer 321 are ferromagnetic materials. A direction of magnetization of the free layer 321 changes in accordance with recorded magnetization of the magnetic disk, and resistance of the magnetoresistive element 32a correspondingly changes. Electric current flows between electrode films 325a and 325b.

The direction of magnetization of the pinned layer 322 is fixed at a definite direction by its exchange interaction with the antiferromagnetic layer 324. The direction of magnetization of the free layer 321 changes in accordance with the recorded magnetization of the recording surface, but a bias is applied in a fixed direction by a bias field generated between hard bias layers 326a and 326b. The instability will deteriorate if the hard bias layers 326a, 326b are too thin and the magnetic bias is not sufficient. The deterioration of the instability is also caused by asymmetry of the magnetic bias applied from the hard bias layers 326a, 326b formed at both sides of the free layer 321.

Figure 11A:
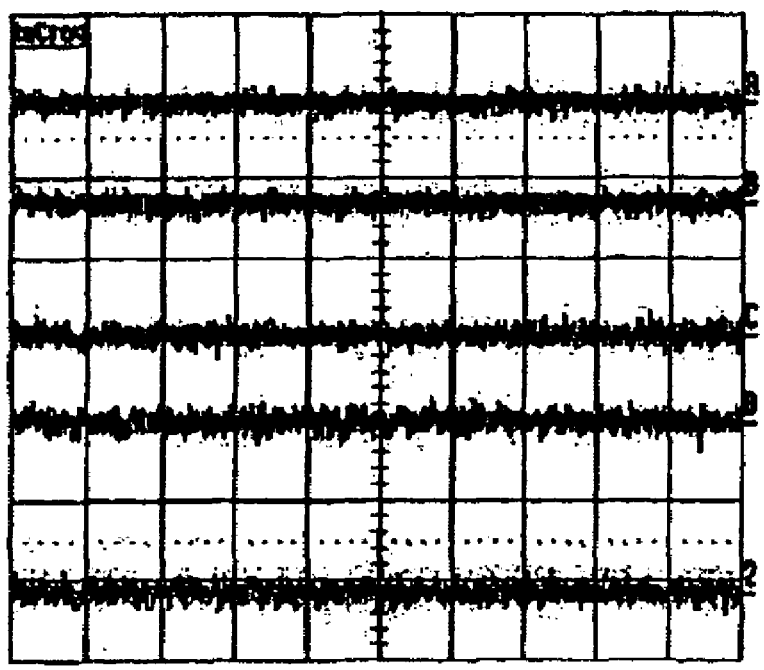
FIGS. 11(a) and 11(b) are graphs that show deterioration of instability due to TFC.
Figure 11B:
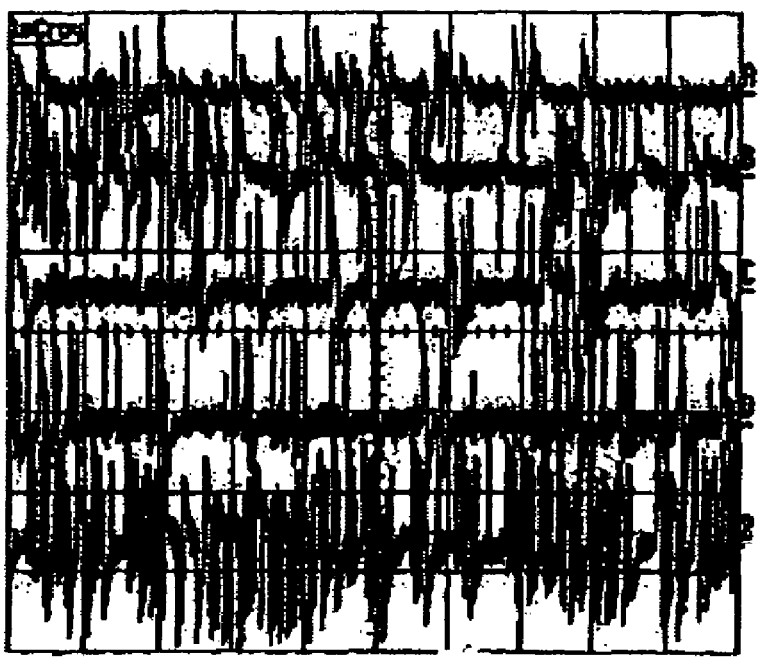

Thermal flyheight control (TFC) causes deformation of the head element section 122, and the expansion or temperature rise thereof by the heater 124, or both of these two events change the bias field generated between the hard bias layers 326i a, 326b. Accordingly, head instability changes according to a particular value of the heater power. Thermal expansion of the head element section also causes changes in interactions between the antiferromagnetic layer 324, the pinned layer 322, the nonmagnetic layer 323, the free layer 321, and the protective layer 327, and thus changes head instability. Typically, head instability deteriorates with increases in the heater power. FIGS. 11A and 11B show examples of reading signal waveforms of the reading element 32 during an OFF state and ON state, respectively, of the heater 124.

FIG. 11(a) shows the signal waveforms generated when the heater 124 is in the OFF state, and FIG. 11(b) shows the signal waveforms generated when the heater 124 is in the ON state. The heater power in both cases is 17 mW. Also, the multiple graphs shown in FIGS. 11A and 11B show the signal waveforms developed at different reading bias voltages, and the signal levels shown from graph A at top to graph 2 at bottom are equivalent to 125 mV, 145 mV, 165 mV, 185 mV, and 205 mV respectively.

As can be understood by comparison of FIGS. 11(a) and 11(b), the reading signal waveforms are significantly varied by turning ON the heater 124 for the expansion of the head element section 122. More specifically, noise increases amplitude significantly and makes the amplitude significantly asymmetrical. These indicate that the thermal expansion of the head element section 122 has deteriorated head instability.

Although the instability is typically deteriorated by turning ON the heater 124, the instability is suppressed by turning ON the heater 124 in a part of all tested head sliders 12. This is considered to be due to the fact that turning on the heater 124 deforms the head element section 122 so as to improve the bias field in the OFF state or changes the temperature of the head element section so as to improve the bias field. These events, however, are observed in a part of all tested head sliders 12.

The HDC/MPU 23 in the present embodiment conducts judgments on head instability and changes the ERP step execution priority in accordance with judgment results. In the present embodiment, the MPU 232 that operates in accordance with microcodes judges the instability and determines the step execution priority in the ERP. The instability judgment by the MPU 232 will be described on later pages. Processing that will occur if the instability is judged to have overstepped from its judgment criteria will be first described below. Since head instability varies from head slider to head slider, the MPU 232 conducts independent instability judgments and independent ERP control, for each head slider 12. The head slider can be identified from a logical block address (LBA) of the data specified by the host 51.

As described above with reference being made to FIGS. 11(a), 11(b), a level of the instability varies with the operating state of the heater 124. When the MPU 232 judges the instability to have overstepped required criteria, therefore, the MPU 232 raises the execution priority of the heater power changing steps in the ERP. For example, the MPU raises execution priority of the steps from STEP X to STEP X+5, pre-registered in the reading ERP table of FIG. 4.

In another case, the instability typically deteriorates with increases in the heater power. Therefore, the step of reducing the heater power is preferably executed prior to the step of increasing the heater power. In the example of FIG. 4 showing a reading ERP table, the execution priority of the steps from STEP X to STEP X+5 is set to be higher than that of the steps from STEP X to STEP X+2.

If a relationship between an increase/decrease in the heater power and the deterioration of the instability is specified, the execution priority of the heater power increasing step and that of the heater power reducing step are preferably determined. For example, for a head slider in which the instability is suppressed by an increase in the heater power, the priority level of the heater power increasing step is set to be raised above that of the reducing step.

The above also applies to a writing ERP table. After judging the instability to have overstepped required criteria, the MPU 232 raises the execution priority of the heater power changing steps. This writing ERP table preferably includes the step not only of deforming a waveform of a writing current so as to reduce strength of a magnetic field generated by the writing current, but also of changing (increasing) the heater power at the same time so as to compensate for a change in calorific value due to the change in the heater power. Typical values that define a writing current waveform include a writing current value, a kick amplifier value, and kick length.

As shown in FIG. 12, kick amplifier value KA refers to a peak output level of writing current waveforms, and a large value is applied for improving initial writing characteristics. Kick length KL is a length of the peak output. The writing current value is an average value of the writing currents applied after the kick amplifier value has been obtained. Reducing either the writing current value, the kick amplifier value, or the kick length reduces strength of a magnetic field created by the writing current. Instability of the reading element 32 during writing can thus be improved. At the same time, the writing element 33 decreases in calorific value, so for reduced changes in temperature conditions, the heater power is preferably increased so as to compensate for the decrease in the calorific value of the writing element 33. Although it is preferable that the decrement be almost completely compensated for, the heater power may be set so as to compensate for a part of the decrement.

The following describes the instability judgment process conducted by the MPU 232. The present embodiment uses four items as instability judgment criteria. One is a reading error rate of user data, one is an execution rate of an ERP in user data reading, one is a reading error rate of servo data, and one is a change in a reading signal waveform of the user data.

The MPU 232 in the present embodiment judges whether each of the four criteria is exceeded. If any one of the criteria is exceeded, the MPU 232 sets up a flag to indicate that. If flags are set up for two or more criteria, the MPU 232 changes the execution priority of the TFC step in the ERP table, as described above. It is possible, by changing the TFC step execution priority when multiple criteria are exceeded, for the MPU to judge more reliably whether the instability is deteriorated in excess of the criteria, and conduct the ERP more effectively.

The MPU 232, when so designed, may change the execution priority of the step if three or more of the criteria or all thereof are exceeded, or may also change the execution priority of the step if one specific criterion is exceeded. Alternatively, the execution priority of the step may be changed, even if any one of the criteria is exceeded.

First, a reading error rate of user data is described below. After reading out user data from the magnetic disk 11, the HDC/MPU 23 executes an error checking and correction (ECC) process for the user data that has been read out. Typically, the error correction is conducted in either an "On The Fly" (OTF) mode that is an online correction process, or a loss correction mode that is an offline correction process. The OTF mode is initially set, and this mode is changed to the loss correction mode if the OTF error correction is impossible. The OTF mode and the loss correction mode differ in process method, and the error correction in the loss correction mode can correct errors twice as many as in the OTF mode. If a change in signal waveform is increased by the instability, the error rate increases substantially. Therefore, the error rate can be used as an instability judgment criterion.

In the OTF mode, codewords in a data sector are continuously read and while any errors are being corrected, the user data is continuously transferred to the host 51. In the loss correction mode, if a codeword is loaded (read in) that cannot be subjected to the error correction in the OTF mode, the loading of the codeword and the transfer of the user data are temporarily stopped and an error in the codeword is corrected. The loading of the codeword and the transfer of the user data are restarted after the correction.

In both the OTF mode and the loss correction mode, after a cyclic redundancy check code (CRCC) and an error correction code (ECC) have been transferred from R/W channel 21, these codes are used to conduct the error correction process. The ECC and the CRCC can use, for example, a Reed-Solomon code that can be computed on Galois field GF (28). During the loss correction process, a position most likely to be where an error exists is estimated as a loss position, based on which the data containing the error is then calculated. The error correction process is a widely known technique, detailed description of which is omitted herein.

In both the OTF mode and the loss correction mode, the HDC 231 primarily executes the error correction process and calculates the error rate. Irrespective of the correction mode, the MPU 232 acquires from the HDC 231 the error rate in the error correction process. If the error rate exceeds a criterion established beforehand, the MPU 232 sets up a flag to indicate that the criterion has been exceeded.

Next, an execution rate of an ERP in user data reading is described below. In this example, an execution count of a reading ERP with respect to a data transfer volume is used as a reference value of the execution rate. If a change in signal waveform is increased by instability, reading errors abruptly increase and the execution rate of the reading ERP increases. The execution rate of the reading ERP, therefore, becomes an instability judgment criterion. In addition to the execution rate of the entire reading ERP, an execution rate of specific steps which have been set in the ERP table beforehand can be used as a judgment criterion. Both or either of these criteria may be used.

By using a command sent from the host 51, the MPU 232 can measure the volume of data transfer from the magnetic disk 11 and the execution count of the reading ERP. For each head slider 12, the MPU 232 calculates from these values the data transfer volume and reading ERP execution count per unit time. If the MPU judges that the reading ERP execution count relative to the data transfer volume is in excess of the foregoing criterion (the execution rate of the reading ERP), the MPU sets up a flag to indicate that the criterion has been exceeded. The same also applies if the required criterion is exceeded for specific steps in the ERP table. The reading ERP execution rate indirectly becomes an indicator of a user data error rate. Also, the execution rate of the ERP or of specific steps may be calculated using a value different from the data transfer volume.

Next, a reading error rate of servo data is described below. During reading and writing processes, the HDC/MPU 23 positions the head slider 12 in accordance with the servo data that the head slider 12 has read out from the magnetic disk 11. If a change in signal waveform is increased by instability, servo data reading errors abruptly increase. The reading error rate of the servo data, therefore, becomes an instability judgment criterion.

There are several types of servo data reading errors. FIG. 13(a) shows a data format of a servo pattern. FIG. 13(b) shows how the servo pattern is recorded on the recording surface, and a relationship in position between the writing element 31 and the reading element 32. The servo pattern consists of a PREAMBLE, SERVO ADDRESS MARK (SAM), a track ID (gray code: GRAY), a physical servo sector number (PHSN), and a burst pattern (BURST).

The PREAMBLE includes a pattern for detecting a phase of a reading signal and adjusting an amplification factor of a signal amplifier. The SERVO ADDRESS MARK (SAM) indicates a beginning of servo data. The track ID (GRAY) identifies a track number of a track on which user data will be finally recorded. The physical servo sector number (PHSN) indicates a number of a servo sector within one track. Finally, the burst pattern (BURST) consists of four kinds of patterns, A, B, C, D, and indicates a detailed position of the reading element 32 (head element section 122) within the track specified by the track ID. The reading element 32 reads out the servo pattern, and the MPU 232 conducts head positioning based on the pattern data.

Servo data reading results in an error if the reading element 32 cannot read either section of the servo pattern. The reading error is either a PREAMBLE/SERVO ADDRESS MARK (SAM) reading error, a track ID (GRAY) reading error, or a physical servo sector number (PHSN) reading error. If either of these errors occurs, therefore, this means that a servo data reading error has occurred. The R/W channel 21 that decodes the servo data detects the above errors.

The MPU 232 can know the occurrence of a servo data reading error by accessing a register of the R/W channel 21. For example, if a reading error count relative to a servo data reading count exceeds a criterion that has been set beforehand, the MPU 232 sets up a flag to indicate that the criterion has been exceeded. The MPU 232 can measure an error count per servo reading reference count since the MPU acquires the servo data from the R/W channel 21 in order to position the head.

If an error count exceeding 100 per 30,000 sets of servo data is present as an example, the MPU 232 sets up an flag indicative of an associated criterion being exceeded, or if, during the writing process, a writing abort event due to a servo data reading error continuously recurs in excess of an appropriate reference count, the MPU 232 sets up a flag. If a writing abort event occurs, the MPU 232 starts a writing ERP. If the writing abort event continuously recurs after that, the MPU 232 changes execution priority of a TFC step in the writing ERP table.

Figure 14:
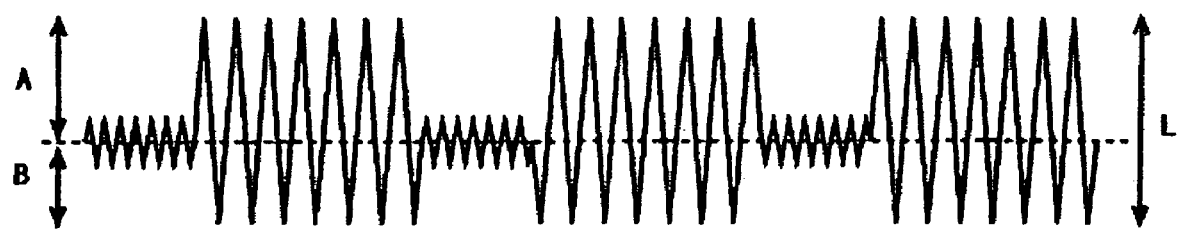
FIG. 14 is a graph that shows characteristics quantities of a reading signal waveform used for instability judgment.

Next, changes in the signal waveform of the user data reading signal are described below. If the instability deteriorates, this causes the event that reading signal noise increases or that positive or negative amplitude of the reading signal increases significantly and becomes asymmetrical. The instability level can be identified by measuring these events. More specifically, the MPU 232 conducts instability judgments based on the amplitude and symmetry of the signal waveform. FIG. 14 shows an example of a signal waveform schematically. Amplitude of this signal waveform is expressed as L. Also, amplitude in a positive direction with respect to a baseline is expressed as A, and amplitude in a negative direction is expressed as B. The symmetry of the signal waveform can be defined as $(A-B)/(A+B)$, for example.

The amplitude and symmetry that becomes the criteria which have been measured during the manufacturing phase are set in the HDD 1. These values are saved on a ROM or the magnetic disk 11. During use of the product after shipping, the R/W channel 21 measures amplitude and symmetry and the MPU 232 acquires measured values from the R/W channel 21. For instance, the MPU 232 acquires amplitude and symmetry from the R/W channel 21 in preset timing such as every 12 hours or each time 10 gigabytes of data is transferred, compares acquired values with the respective criteria, and judges the instability level.

In addition, for example, if a change rate of the measured amplitude value with respect to its reference value (criterion) exceeds the reference (e.g., 20% in terms of increase rate), the MPU 232 sets up the proper flag, or if a change rate of the measured symmetry value with respect to its reference value (criterion) exceeds the reference (e.g., +/−30%), the MPU 232 sets up the proper flag. The reference value and the measured value are preferably the values that have been measured under the same conditions. For example, in a normal-temperature region, a signal waveform obtained under a heater OFF/unload state can be used.

After setting up the flag indicating that any one of the above conditions has held, the MPU 232 may release the flag and return it to its original state if that condition is changed later. In a preferred example, the MPU 232, once it has set up the flag concerning the waveform change, maintains the particular flag state, and for other flags, the MPU 232 returns the set-up flag to the original state in response to a decrease in error rate. A more accurate judgment can thus be conducted. The maintenance of the flag concerning the signal waveform is based on the experimental fact that once the waveform has been changed by the instability, the change event continues.

While, in the above example, the MPU 232 changes the execution priority of the ERP steps on the basis of the instability judgment results, the MPU 232 can use these judgment results for a process other than the ERP. In a preferred example, after judging that the instability has overstepped the criterion, the MPU 232 adjusts the heater power during normal reading/writing. If the instability is in excess of the criterion, the MPU 232 typically reduces the heater power under the same conditions.

Unlike that which operates during normal reading/writing process, the MPU 232 may judge the instability level in an idle state. The MPU can conduct measurements on the error rate and other judgment items by writing desired test data into a management region not used to record the user data present on the magnetic disk 11, and reading out the test data. Also, the MPU can know heater power adjustment results by conducting the reading/writing process in the management region after adjusting the heater power. Thus, the MPU 232 may increase/reduce the heater power and determine its adjustment level.

The MPU 232 may use part of the above judgment items or other judgment items to judge the instability. After judging that the instability oversteps a criterion, the MPU 232 may also report this to the host 51.

While embodiments of the present invention have been described above by way of example, the invention is not limited to or by the above embodiments. Persons skilled in the art can easily make changes, additions, and/or alterations to each constituent element of the above embodiments within the scope of the invention. For example, it is possible to apply any one of the foregoing examples of the TFC to HDDs equipped with head sliders having only a reading element or a writing element, or to media drives other than HDDs.

What is claimed is:
1. A media drive comprising:
a slider that flies above a rotating medium;
a head element section disposed in the slider;
a heater disposed in the slider, wherein the heater causes the head element section to protrude by thermal expansion and adjusts a clearance between the medium and the head element section;
a table which, if an error occurs, identifies an execution step of an error recovery process for the error, wherein the table includes a step of changing the heater in heater power;
a controller that conducts execution control of the execution step identified by the table; and
a temperature detector, wherein, in accordance with a temperature detected by the temperature detector, the drive changes the heater power changing step to be executed in the error recovery process.

2. A media drive comprising:
a slider that flies above a rotating medium;
a head element section disposed in the slider;
a heater disposed in the slider, wherein the heater causes the head element section to protrude by thermal expansion and adjusts a clearance between the medium and the head element section;
a table which, if an error occurs, identifies an execution step of an error recovery process for the error, wherein the table includes a step of changing the heater in heater power;
a controller that conducts execution control of the execution step identified by the table; and
a temperature detector,
wherein, in accordance with a temperature detected by the temperature detector, the drive changes execution priority of the heater power changing step in the error recovery process.

3. The media drive according to claim 2, wherein,
in accordance with the type of error, the drive changes the heater power changing step to be executed in the error recovery process.

4. A media drive comprising:
a slider that flies above a rotating medium;
a head element section disposed in the slider;
a heater disposed in the slider, wherein the heater causes the head element section to protrude by thermal expansion and adjusts a clearance between the medium and the head element section;
a table which, if an error occurs, identifies an execution step of an error recovery process for the error, wherein the table includes a step of changing the heater in heater power;
a controller that conducts execution control of the execution step identified by the table; and
a temperature detector,
wherein, in an error recovery process for a reading error, if a temperature detected by the temperature detector is lower than a reference temperature, the table identifies the step of increasing the heater power, as an execution step.

5. The media drive according to claim 4, wherein,
the table identifies the step of increasing the heater power and the step of reducing the heater power, as execution steps; and
execution priority of the step of increasing the heater power is higher than execution priority of the step of reducing the heater power.

6. The media drive according to claim 4, wherein,
in accordance with the type of error, the drive changes the heater power changing step to be executed in the error recovery process.

7. A media drive comprising:
a slider that flies above a rotating medium;
a head element section disposed in the slider;
a heater disposed in the slider, wherein the heater causes the head element section to protrude by thermal expansion and adjusts a clearance between the medium and the head element section;
a table which, if an error occurs, identifies an execution step of an error recovery process for the error, wherein the table includes a step of changing the heater in heater power;
a controller that conducts execution control of the execution step identified by the table; and
a temperature detector,
wherein, in an error recovery process for a reading error, if a temperature detected by the temperature detector is higher than a reference temperature, the table identifies the step of reducing the heater power, as an execution step.

8. The media drive according to claim 7, wherein,
the table identifies the step of increasing the heater power and the step of reducing the heater power, as execution steps; and
execution priority of the step of reducing the heater power is higher than execution priority of the step of increasing the heater power.

9. The media drive according to claim 7, wherein,
in accordance with the type of error, the drive changes the heater power changing step to be executed in the error recovery process.

10. A media drive comprising:
a slider that flies above a rotating medium;
a head element section disposed in the slider;
a heater disposed in the slider, wherein the heater causes the head element section to protrude by thermal expansion and adjusts a clearance between the medium and the head element section;
a table which, if an error occurs, identifies an execution step of an error recovery process for the error, wherein the table includes a step of changing the heater in heater power; and
a controller that conducts execution control of the execution step identified by the table;
wherein, in accordance with the type of error, the drive changes the heater power changing step to be executed in the error recovery process, and
wherein, in an error recovery process for a writing error during data writing onto the medium, the table identifies the step of reducing the heater power, as an execution step.

11. A media drive comprising:
a slider that flies above a rotating medium;
a head element section disposed in the slider;
a heater disposed in the slider, wherein the heater causes the head element section to protrude by thermal expansion and adjusts a clearance between the medium and the head element section;
a table which, if an error occurs, identifies an execution step of an error recovery process for the error, wherein the table includes a step of changing the heater in heater power; and
a controller that conducts execution control of the execution step identified by the table;
wherein, in accordance with the type of error, the drive changes the heater power changing step to be executed in the error recovery process, and
wherein, in an error recovery process for an error whose servo data reading signal level during a writing process is lower than a reference level, the table identifies the step of increasing the heater power, as an execution step.

12. The media drive according to claim 11, wherein,
in accordance with the servo data reading signal level, the drive determines the heater power in the execution step.

13. A media drive comprising:
a slider that flies above a rotating medium;
a head element section disposed in the slider;

a heater disposed in the slider, wherein the heater causes the head element section to protrude by thermal expansion and adjusts a clearance between the medium and the head element section;

a table which, if an error occurs, identifies an execution step of an error recovery process for the error, wherein the table includes a step of changing the heater in heater power; and a controller that conducts execution control of the execution step identified by the table, wherein the table changes a writing current waveform so as to reduce strength of a magnetic field generated and increases the heater power so as to compensate for a decrease in calorific value due to the change in the waveform.

14. A media drive comprising:

a slider that flies above a rotating medium;

a head element section disposed in the slider;

a heater disposed in the slider, wherein the heater causes the head element section to protrude by thermal expansion and adjusts a clearance between the medium and the head element section;

a table which, if an error occurs, identifies an execution step of an error recovery process for the error, wherein the table includes a step of changing the heater in heater power; and a controller that conducts execution control of the execution step identified by the table, wherein the controller judges whether instability of the head element section is in excess of a reference value, and if the reference value is judged to be exceeded, raises an execution priority level of the step of changing the heater power, wherein the controller raises execution priority of the heater power reducing step to a level higher than execution priority of the heater power increasing step.

15. A method of controlling a media drive including a slider which flies above a rotating medium, a head element section which is disposed in the slider, and a heater which is disposed in the slider, makes the head element section protrude by thermal expansion, and adjusts a clearance between the medium and the head element section, the control method comprising:

if an error occurs, referring to a table that identifies an execution step of an error recovery process for the error;

in the error recovery process, executing the step identified by the table in order to change the heater in heater power; and in accordance with a detected temperature, changing the heater power changing step to be executed in the error recovery process.

16. The method according to claim 15, further comprising, in accordance with the type of error, changing the heater power changing step to be executed in the error recovery process.

17. A method of controlling a media drive including a slider which flies above a rotating medium, a head element section which is disposed in the slider, and a heater which is disposed in the slider, makes the head element section protrude by thermal expansion, and adjusts a clearance between the medium and the head element section, the control method comprising:

if an error occurs, referring to a table that identifies an execution step of an error recovery process for the error;

in the error recovery process, executing the step identified by the table in order to change the heater in heater power; and in accordance with a detected temperature, changing execution priority of the heater power changing step to be executed in the error recovery process.

18. The method according to claim 17, further comprising, in accordance with the type of error, changing the heater power changing step to be executed in the error recovery process.

19. A media drive comprising:

a slider that flies above a rotating medium;

a head element section disposed in the slider;

a heater disposed in the slider, wherein the heater causes the head element section to protrude by thermal expansion and adjusts a clearance between the medium and the head element section; and a controller that judges whether instability of the head element section is in excess of a reference value, and if the reference value is fudged to be exceeded, adjusts the power supplied to the heater, wherein the controller judges the instability on the basis of an execution rate of error recovery processes with respect to data reading operations and/or an execution rate of specific steps in an error recovery process.

20. A media drive comprising:

a slider that flies above a rotating medium;

a head element section disposed in the slider;

a heater disposed in the slider, wherein the heater causes the head element section to protrude by thermal expansion and adjusts a clearance between the medium and the head element section; and a controller that judges whether instability of the head element section is in excess of a reference value, and if the reference value is judged to be exceeded, adjusts the power supplied to the heater, wherein the controller judges the instability on the basis of an error rate of registered servo data read out from the medium by the head element section.

21. A media drive comprising:

a slider that flies above a rotating medium;

a head element section disposed in the slider;

a heater disposed in the slider, wherein the heater causes the head element section to protrude by thermal expansion and adjusts a clearance between the medium and the head element section; and a controller that judges whether instability of the head element section is in excess of a reference value, and if the reference value is judged to be exceeded, adjusts the power supplied to the heater, wherein the controller judges the instability in accordance with amplitude and/or symmetry of a waveform of a signal from a reading element of the head element section.

22. A media drive comprising:

a slider that flies above a rotating medium;

a head element section disposed in the slider;

a heater disposed in the slider, wherein the heater causes the head element section to protrude by thermal expansion and adjusts a clearance between the medium and the head element section; and a controller that judges whether instability of the head element section is in excess of a reference value, and if the reference value is judged to be exceeded, adjusts the power supplied to the heater, wherein the instability is judged using at least any two criteria of all those which include an error rate of data read out by the head element section, an execution rate of error recovery processes with respect to data reading operations and/or an execution rate of specific steps in an error recovery process, an error rate of registered servo data read out from the medium by the head element section, and amplitude and/or symmetry of a waveform of a signal from a reading element of the head element section; and if the required plurality of judgment criteria are all overstepped, the controller judges that the instability of the head element section is outside an allowable range.

* * * * *

UNITED STATES PATENT AND TRADEMARK OFFICE
CERTIFICATE OF CORRECTION

PATENT NO. : 7,525,752 B2  Page 1 of 1
APPLICATION NO. : 11/705915
DATED : April 28, 2009
INVENTOR(S) : Satoh et al.

It is certified that error appears in the above-identified patent and that said Letters Patent is hereby corrected as shown below:

Column 8, line 54, after "into three" please insert -- temperature --
Column 8, line 55, after "a high temperature" please delete "temperature"
Column 13, line 60, please delete "326i a" and insert -- 326a --

Claim 19, column 22, line 17, please delete "fudged" and insert -- judged --

Signed and Sealed this

Twenty-third Day of June, 2009

JOHN DOLL
*Acting Director of the United States Patent and Trademark Office*